Aug. 22, 1939. A. P. B. RENSHAW 2,170,160
TRAFFIC CONTROL SYSTEM
Filed Jan. 31, 1936 3 Sheets-Sheet 1

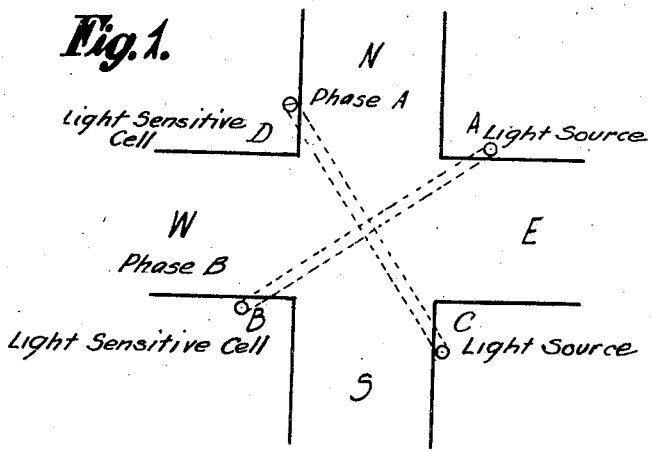

| Camshaft Position | \multicolumn{15}{c}{Cam Spring Nos.} | | Timing | Counting |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | | | |
| 1 | X | | | | | | | X | | | | | | | X | Initial A | QA | |
| 2 | | | X | | X | | | | X | X | | | | | X | Vehicle A | QB | QA |
| 3 | | | | X | | | | | | X | | | | | X | Amber A | QB | |
| 4 | | X | | | | | | | | X | | | | X | | Initial B | QB | |
| 5 | | | | X | | X | | | | | X | X | | | X | Vehicle B | QC | QB |
| 6 | | | | X | | | | | | | X | | | | X | Amber B | QC | |
| 7 | X | | | | | | | | | | X | | | X | | Initial A | QC | |
| 8 | | X | | | X | | X | | | | | | X | | X | Vehicle A | QA | QC |
| 9 | | | | X | | | X | | | | | | | | X | Amber A | QA | |
| 10 | X | | | | | | X | | | | | | | X | | Initial B | QA | |
| 11 | | | X | | | X | | X | X | | | | | | X | Vehicle B | QB | QA |
| 12 | | | | X | | | | | X | | | | | | X | Amber B | QB | |
| 13 | X | | | | | | | | X | | | | | X | | Initial A | QB | |
| 14 | | X | | | X | | | | | X | X | | | | X | Vehicle A | QC | QB |
| 15 | | | | X | | | | | | X | | | | | X | Amber A | QC | |
| 16 | X | | | | | | | | | X | | | | X | | Initial B | QC | |
| 17 | | | X | | | X | X | | | | X | | | | X | Vehicle B | QA | QC |
| 18 | | | | X | | X | | | | | | | | | X | Amber B | QA | |

INVENTOR
ALFRED PERCY BAILEY RENSHAW
BY Edwards, Bower + Pool
ATTORNEYS

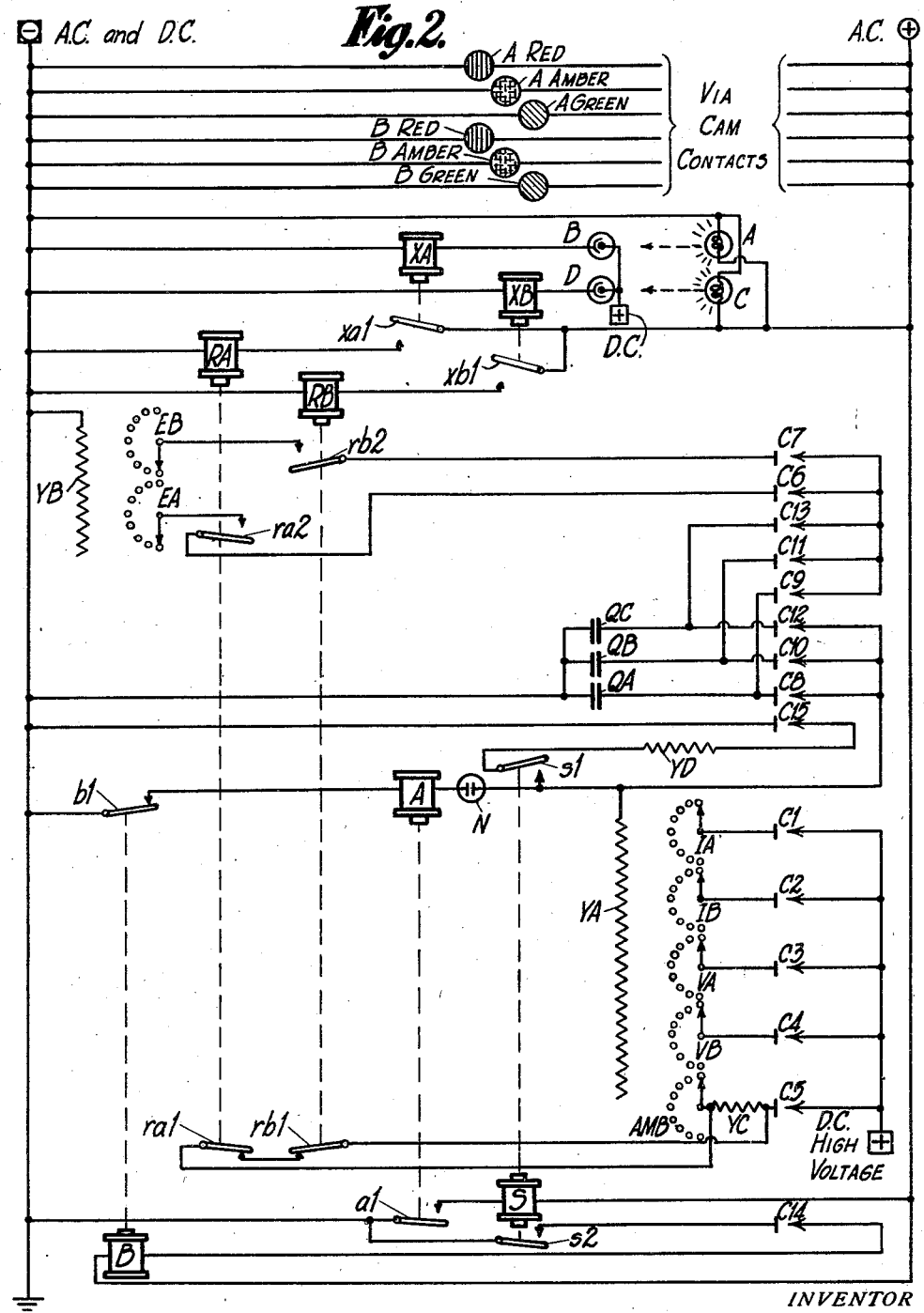

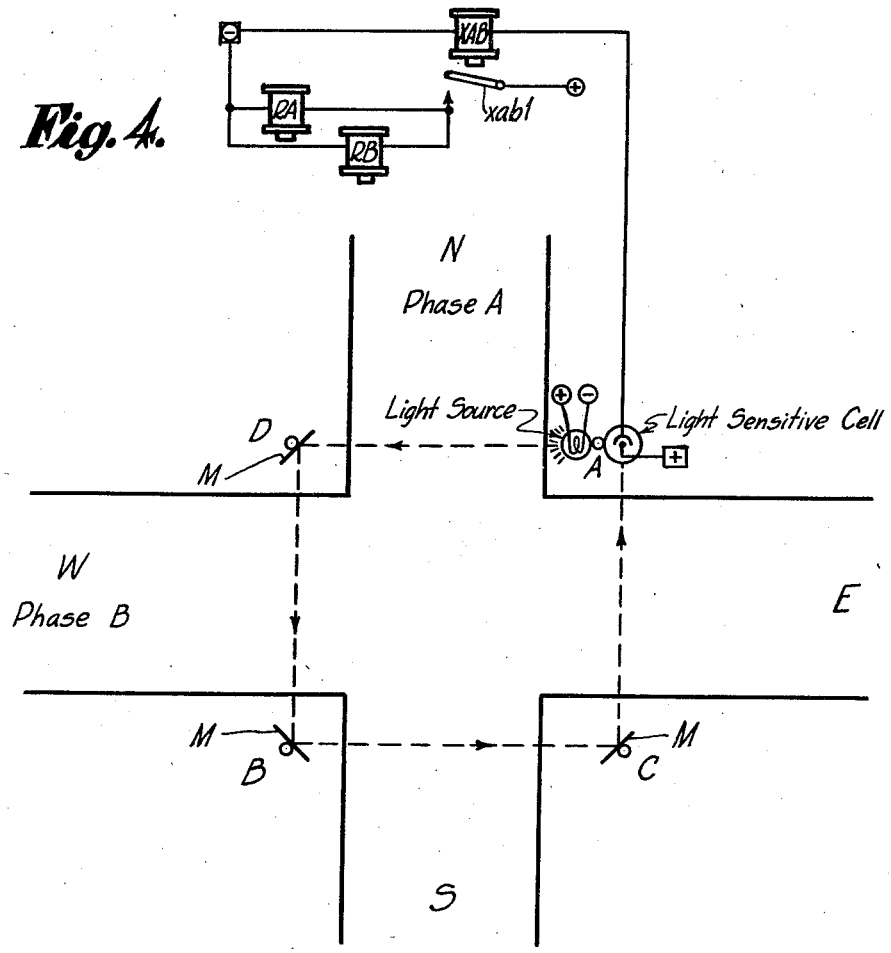

Patented Aug. 22, 1939

2,170,160

UNITED STATES PATENT OFFICE 2,170,160

TRAFFIC CONTROL SYSTEM

Alfred Percy Bailey Renshaw, Kingston Hill, England, assignor, by mesne assignments, to Automatic Telephone & Electric Company Limited, London, England Application January 31, 1936, Serial No. 61,699
In Great Britain February 12, 1935

20 Claims. (Cl. 177—337)

The present invention concerns improvements in or relating to signalling systems for controlling street traffic, including both vehicles and pedestrians. Traffic signalling systems in the past have employed either arrangements for controlling the signals in a cycle of changes at fixed times or arrangements in which the changes of the signal were controlled by a single vehicle or by successive individual vehicles. The latter systems ordinarily allow a certain time of right-of-way for each vehicle actuating the system, successive individual vehicles extending their right-of-way time for themselves. The present system in contrast to such former systems, does not depend directly on individual actuations by individual vehicles. It does not depend upon accurate counting of various units of traffic approaching or passing the intersection and it is not its purpose to accurately measure traffic, but has for its general purpose the provision of a simple form of a signal control which will pass traffic through the intersection with a minimum of delay and for this purpose will adjust the time cycle of a traffic right-of-way signal in accordance with a very approximate indication of the amount of traffic passing the intersection.

The first object of the present invention is to provide a traffic signalling system in which the signals are controlled in accordance with the collective effect of a number of vehicles so that the duration of the right-of-way period given to each road is dependent upon the approximate amount of traffic in the road. The advantages of dealing with traffic on the basis of quantity occur principally in heavy traffic periods when there is a likelihood of congestion of traffic.

One of the objects of the present invention consists in providing arrangements for controlling the traffic signals in accordance with the trend of traffic density on the intersecting lanes.

A further object of the invention consists in providing an arrangement for assessing the amount of traffic over a given period by summing or integrating the effects of the vehicles passing a certain point; for instance the interruptions of a beam of light acting on a light-sensitive cell are adapted to control the charge or discharge of a condenser so that the state of charge of the condenser is a measure of the total interruption of the beam by the traffic.

Another object of the present invention concerns the positioning of the detecting means and according to this feature of the invention the detecting means are located actually at or in the intersection, for instance diagonally. In one form the detecting means are rendered effective only for a portion of the total cycle in dependence upon the signals being shown.

Another object of the invention is to provide an arrangement whereby right-of-way is given to each of the intersecting lanes in succession at comparatively short intervals and in the event of traffic in any lane increasing to any appreciable extent then the succeeding right-of-way period for that lane is increased in duration and so on for subsequent cycles as long as the traffic calls for it. In the event of the traffic decreasing again, the right-of-way period is reduced, though not necessarily at the rate at which it increased.

Still another object of the invention is to provide a detecting arrangement whereby vehicles and pedestrians jointly control the operation of the signals; for instance, both vehicles and pedestrians may be arranged to interrupt a detecting beam or beams and thereby exert complementary control.

With these and other objects in mind reference is now had to the accompanying sheets of drawings, in which:

Figure 1 represents a typical intersection of two streets where a traffic control system embodying the invention is installed.

Figure 2 is a circuit diagram for a controller in a traffic control system embodying the features of the invention, arranged to control right-of-way signals at the intersection and having a number of cam contacts operated at appropriate times by cams mounted on a cam shaft.

Figure 3 is a table showing in which positions of the cam shaft each of the several cam contacts are closed, such closure being indicated by the symbol X in the proper squares.

Figure 4 shows an alternative arrangement for detecting traffic passing across the intersection which arrangement utilizes a single light beam reflected across the mouths of the intersecting roads. When this system is used a slight modification of the circuit of Figure 2 is required and a form of such modification is also shown in Figure 4.

Referring to Figure 1, there is represented the intersection of a street or road NS running for instance north and south and a street or road WE running east and west. It should be understood that the invention is in no way limited to simple intersections such as the one shown but is capable of being applied to complicated intersections having a plurality of intersecting streets, or intersections which require interlinking with other intersections of a group. Two of the posts, for instance A and C, carry a light-beam-projecting apparatus, while two other posts such as B and D carry light-sensitive cells. These posts may conveniently also be used for carrying the signal lights. The beam-projecting apparatus on each of the posts A and C conveniently consists of two lamps with associated lens and/or mirror equipment for projecting beams in the directions indicated so that the beams from the lamps at A are directed on to the light-sensitive cells at B and the beams from the lamps at C are directed on to the light-sensitive cells at D. By arranging a pair of lamps and a pair of light-sensitive cells it is possible in the case of failure of either a lamp or a light-sensitive cell to arrange for the alternative lamp and/or cell to be brought into action without any mechanical movement being required. It might also be satisfactory to direct the light from both projectors onto a single cell. The actual beam employed may be one of visible light or possibly of infra-red rays which are not unduly absorbed by a misty atmosphere and are normally invisible. Conveniently the beam may be horizontal and about 4 ft. 6 in. above the road surface as this height is found to be most suitable for the various kinds of traffic.

It should be mentioned that as an alternative to the arrangement suggested above, the light sensitive cells and the projectors might both be located on the same posts, the co-operating post merely carrying a mirror. A further possibility which might possess advantages in certain cases would be to reflect a single beam across the mouth of each road from A to D, D to B, B to C, and C to a light sensitive cell at A as shown in Figure 4. The reflectors M serve to reflect the beam from one corner of the intersection to the next. This beam is arranged to be intercepted by all traffic crossing the intersection. The light sensitive cell is connected to the control mechanism so that the same beam is effective for actuation in each green period to adjust the next corresponding green period. Still other arrangements of the light sources and light cells may be utilized in accordance with the special requirements of particular installations.

Referring now to Figure 2 showing a circuit arrangement for a controller embodying the invention, this controller is of generally known type and includes a number of contacts to be closed at appropriate times by means of a camshaft which is rotated step-by-step by a solenoid. The operation of the solenoid is controlled by a relay in series with a gas discharge tube which strikes when a condenser associated therewith in parallel with the tube and relay has been charged to a predetermined voltage. The time required is determined by the value of the resistance connected in the condenser circuit and in the arrangement shown three condensers are used which are effective in turn. The resistance may be varied by means of the adjusting switches IA, IB, VA, VB and AMB which are connected to suitable tappings of the resistance YA. The cam contacts actually controlling the signal lamps have not been shown.

The operation is briefly as follows:

When right-of-way is being given to the NS road the beam A—B is active and the beam C—D is inactive. The traffic crossing the intersection from the road NS may be considered as straight-ahead traffic, traffic turning to the right and traffic turning to the left. The traffic turning to the right takes up the minimum of time in passing through the intersection and can conveniently be neglected. Consequently the beam is arranged not to be intercepted by such traffic. The traffic turning to the left or passing straight through interrupts the beam and it is the total length of the interruption which controls the operation of the signals. In the arrangement shown it determines the duration of right-of-way to the NS road in the next cycle. The controller thus in the absence of traffic or in light traffic conditions accords right-of-way to each of the intersecting roads in succession for short periods, and as traffic appears in one or more roads and tends to increase, the right-of-way periods become progressively longer on such roads.

The beam C—D comes into action as soon as right-of-way is given to the EW road, the usual amber periods being given during the change of right-of-way as thought desirable. The beam C—D in the same way as the beam A—B measures the straight-ahead traffic and the traffic turning left. Obviously in a situation where the rule of the road is to keep to the left, the beam CD would be the active one when right-of-way is being given to the N—S road and similarly the beam A—B for right-of-way on the EW road. It is also to be noted that the beam projectors and receivers are set back from the edge of the road so that the respective beams are intercepted by pedestrians moving along the road having right-of-way as well as by vehicle traffic in the road so that the system provides for an automatic regulation of vehicle-actuated signals at an intersection but it is the joint effect of the vehicles and the pedestrians which determines the nature of control to be effected. This has the advantage of ensuring that a large volume of pedestrian traffic is not unduly held up but pedestrians are given consideration in the same way as vehicles without any special action on their part.

A more detailed description of the method of operation will now be given with reference to the circuit shown in Fig. 2. The beam A—B is arranged to fall on photocell B which is thereby rendered conducting to operate sensitive relay XA. By a circuit thru armature $xa1$ in the de-energized position of relay XA a circuit is completed to energize relay RA. Hence relay RA is energized in response to interruption of the beam A—B by traffic passing when right-of-way is being given to the NS road. Similarly, by sensitive relay XB, a relay RB is operated in response to the presence of traffic passing thru the intersection and interrupting the beam C—D in the WE road right-of-way period. When a single beam is used, as shown in Figure 4, only one sensitive relay XAB is required and over its contact $xab1$ in its deenergized position a circuit is completed energizing both relays RA and RB. It will be understood that other arrangements for operating the contacts of relays RA and RB under the control of the photocells might easily be provided, or even that other detecting means such as suitably located road pads, or pressure sensitive detectors, be arranged upon actuation to operate the relays RA ant RB.

The contacts numbered C1—C21 and any signal cam contacts for example are operated by the cam shaft which is rotated step by step by the operation of the solenoid S which also on energization operates the contacts S1 and S2. The relay A is connected in series with a gas discharge tube N, preferably a neon lamp, and is adapted to be operated when the voltage across the appropriate condenser reaches a critical value. The characteristic of this tube is such that as soon as the voltage across the tube's electrodes reaches this critical value the gas within the tube is ionized and becomes conducting. Current continues to flow thru the tube until the voltage has fallen very considerably below the value for initiating conduction. The relay B is provided for preventing the discharge of the condenser to which is assigned the duty of registering the traffic density. Three condensers are provided, QA, QB, QC, which are connected up cyclically under the control of the cams to bring about the various circuit operations in turn although it will be seen that with certain modifications some other number of condensers might be used.

By reference to Fig. 3 it will be noted that in the present embodiment the cam shaft contains eighteen contact positions, or sufficient positions for three complete cycles of the signal indications, there being conveniently, as outlined below, six camshaft positions for each cycle of signal indications. The signals, which may for instance be the familiar green, amber, and red colored lights indicating respectively, "Go", "Caution" and "Stop", are operated by suitable cam contacts in such cam shaft positions as will give the type of signal cycle desired. For convenience of description the signal cycle assumed herein, as shown in the table of Figure 3, comprises for each street or phase an initial interval of right-of-way of fixed length, a vehicle interval or main "go" period which is dependent in length upon traffic conditions at the intersection, and an amber clearing or caution period following green for indicating change of "go" from one phase to the other. Thereafter these same periods are repeated for the other phase. By rearranging the cams and the positions in which they operate their associated contacts it will be seen that other desired signal cycles may be obtained.

Assuming for instance the cam shaft to be in position 2 corresponding with the main "go" period for the NS road or phase A, the cam contacts C3, C6, C9, C10 and C15 will be closed as may be seen from the table. The circuit from positive, cam contacts C3, adjusting switch VA, resistance YA, cam contacts C10 and condenser QB, to negative, charges the condenser QB at a rate determined by the size of condenser QB and the resistance YA to the critical or ionizing potential of tube N and thus determines the timing of the main "go" period for phase A. While QB is thus timing the period during which right-of-way is being given to the NS road, any vehicle or pedestrian crossing the intersection and breaking the beam A—B causes the light-sensitive apparatus to function and operate relay RA. As will be explained later, whenever the cam shaft takes up position 2 condenser QA is always charged to a little less than the striking voltage of the neon tube. Relay RA when operated closes a circuit to discharge condenser QA via cam contacts C9, C6, contact $ra2$ and resistance YB, tappings of which are connected to the adjusting switches EA and EB. Condenser QA therefore will be discharged to an extent dependent upon the duration of interruption of the beam A—B, which is a convenient way of measuring the amount of traffic passing through the beam.

Meanwhile condenser QB is being charged thru resistance YA as outlined above, and eventually the voltage across condenser QB reaches the critical voltage of tube N whereupon the circuit thru the latter suddenly becomes conducting and relay A is operated. Relay A in turn by its armature $a1$ closes the circuit for energizing solenoid S which by means of a pawl and ratchet (not shown) advances the cam shaft from position 2 to 3.

If QA is, for instance, half discharged when QB finally completes its charge and the solenoid steps the cam shaft to position 3, QA remains in this condition until later. During the stepping operation, QB is discharged via cam contacts C15, low resistance YD and contact S1 so that upon recommencing to be charged condenser QB will always start from the same initial charge, substantially zero. In position 3 cam contacts C5, C10 and C15 are closed and the amber signal is given to street A; the duration of this indication is timed by QB by a charging circuit from positive over cam contacts C5, contacts $rb1$ and $ra1$, switch AMB, resistance YA, and cam contacts C10 (cam contacts C11 being now open). If a vehicle should be interrupting the beam while the amber signal is given, either relay RA or relay RB will be operated and the amber period automatically extended due to the breaking of the shunt circuit over $ra1$ and $rb1$ and the consequent insertion of an additional resistance YC in the timing circuit. This extension it will be noted is not a fixed amount but is dependent on the duration of interruption of the beams, both beams being effective for this purpose. Thus if the crossing should be somewhat congested when the signal change takes place, the amber signal is automatically extended an amount roughly dependent on the degree of congestion. The duration of the amber period is variable between predetermined minimum and maximum periods, one or both of which may be manually adjustable. With the arrangement shown the minimum value is adjustable but the difference between the minimum and maximum values is fixed by the value of the resistance YC.

The camshaft is stepped from position 3 to 4 when the condenser being charged has attained a voltage sufficient for tube N to flash operating in succession relay A and solenoid S. In similar fashion the camshaft is stepped from one position to the next thru its cycle whenever tube N is rendered conducting.

Position 4 represents the starting or initial interval position for phase B during which right-of-way is given to the EW road, the B Street green and A Street red signals being energized over their associated cam contacts (not shown). This period is timed by the charging of the condenser QB over cam 2, switch IB and cam contacts C10. When the neon lamp flashpoint is reached, relay A operates and closes the solenoid circuit. The solenoid in addition to stepping the cam shaft into position 5 closes momentarily the circuit for operating relay B via cam contacts C14 and contacts $s2$ and relay B at armature $b1$ opens the neon lamp circuit. In this case QB is not appreciably discharged since cam contacts C15 are open and its only loss of charge is through the neon lamp before relay B operates. In position 5, therefore, QB starts with a potential only a little below the striking voltage of the neon tube. Condenser QB is now connected up through cam contacts C7 and C11, armature $rb2$, adjusting switch EB, resistance YB, so as to discharge upon operation of contacts $rb2$ when the beam C—D is broken by vehicles on the EW road, while condenser QC which bears at this time a charge dependent in amount upon the stored registration from the previous phase B main "go" period (in the same manner described above for condenser QA in position 2 of the cam shaft), is connected up through cam contacts C12 and C4 to time the duration of the main "go" period.

This signal is terminated in due course and the cam shaft steps on to give the amber leaving phase B change period, 6, and the initial interval for phase A, both these periods being timed by condenser QC starting from a fully discharged condition. These periods are timed by the charging of condenser QC in a manner similar to the way in which condenser QB was charged to time amber period 3 and phase 3 initial interval 4. In position 8 of the cam shaft however condenser QA becomes operative, and it will be remembered that when right-of-way was last taken from this phase it was assumed that QA was left half discharged by passing vehicles. QA is now connected to the timing circuit as cam contacts C8 are closed in this position and cam contacts C9 open. Since QA is at half striking potential, the period which will elapse before QA reaches a potential sufficient to cause the neon tube to strike is greater than would have been the case if QA had been nearly fully charged, and less than if it had been merely fully discharged. It will be seen that if there had been no vehicles at all then the controller would normally be changing right-of-way from one road to the other at minimum intervals, that is after each initial interval, since the appropriate condenser would be left with practically a full charge.

The table constituting Figure 3 in addition to showing the contacts which are closed in the various positions of the cam shaft gives also the nature of the timing period. The table also shows which condensers are in action and their function, whether timing the interval or determining the amount of traffic in order to influence the timing of the succeeding interval on that phase.

It will thus be seen from this table that the condensers QA, QB and QC successively assume different roles in the arrangement illustrated.

It will be understood however that considerable modifications may be made in the circuit details without departing from the spirit of the invention, for instance additional condensers could be provided and each one have its own function. Moreover it is not essential for the right-of-way period to be composed of an initial interval and a vehicle interval as the passage of vehicles might vary the length of the succeeding right-of-way period considered as a whole. The arrangement of dividing the interval up, however, which follows customary commercial practice, enables the system to be more readily adjusted to meet the requirements of varying traffic densities.

One of the advantages of the system proposed according to the present invention is that installation costs are reduced to a minimum. There is the necessity neither for disturbing the road surface nor for having cable connections extending from the intersection to detectors located some distance away. Furthermore there is a minimum of difficulty in deciding upon the location of the detectors for any particular intersection and the maintenance of detectors also is reduced to a minimum, as under normal conditions the detector will not be in any way subject to wear by the traffic. Moreover since according to the invention the trend or tendency of traffic volumes is measured, the waiting time per vehicle at busy intersections can be reduced to a minimum and consequently the congestion of traffic. Further the detector equipment will not require designing specially for the individual junctions and will cater for special traffic such as trams and horses.

It should be understood, however, that the invention is not limited to the particular arrangements described; for instance other arrangements for measuring the tendency of traffic could be employed such as a road pad or other detector located at some distance from the intersection to measure the traffic approaching the intersection. Furthermore the exact arrangement described for measuring traffic may be modified, for instance a simple counting arrangement might be employed. Further it may be found desirable to combine features of the system above described with the features of existing systems so that according to the density of traffic one system or the other may take control or at any rate predominate.

It will be seen from the foregoing that apparatus embodying the present invention provides a traffic signalling system in which a cyclic display of right-of-way signals to each of the traffic lanes at an intersection is modified in accordance with the density of the traffic in the lanes. An approximation of traffic conditions at the intersection is obtained by sampling the traffic flow passing an arbitrary line or point at or in the intersection and the amount of variation in length from the basic signal cycle is thereby determined. The invention also provides a novel method of obtaining such a collective indication of the volume, speed and spacing of the traffic thru an intersection, by measuring the amount of interruption of suitably directed light beams over a predetermined period of time. The invention does not concern itself with the actual value of individual factors such as speed and spacing mentioned above, as it will be appreciated that an individual vehicle travelling slowly might actuate the system for a longer time and thus have more effect than a series of vehicles travelling rapidly, and it will be understood that the spacing between vehicles in a stream of traffic will vary considerably; although the general trend of spacing is to decrease when traffic is heavy and relatively congested and to increase when traffic is flowing readily and at relatively higher speeds. The location of the detecting beams across or in the intersection so as to be interrupted by substantially all the traffic provides a simple way of obtaining a general indication or rough approximation of the amount of traffic passing. In general, the more the beam is interrupted by passing traffic the more time is required to be given for the traffic and the longer the time cycle of the traffic signal should be. This is true whether the traffic is composed of many short fast vehicles such as small pleasure cars or fewer longer and slower vehicles such as buses, trucks and street railway cars. The type and location of the traffic detector gives a measure of cumulative time of actuation resulting from the passage of many types of vehicles as well as pedestrians. This is referred to as a collective effect or collective indication of traffic, and this may be used by many types of timing adjustment devices to control the timing of a traffic signal. The term "traffic volume" is used herein in its general meaning of the number of vehicles passing a given point in a given time and is used in a relative sense rather than in the sense of exact values. The term "traffic density" is used more in the sense of the proportion of the available street space which is occupied by the moving traffic. In relatively congested traffic conditions, due to the lower speed of traffic ordinarily found under such conditions, the density of traffic might be greater with the same or less traffic volume.

The term "amount of actuation" is used herein in the sense of the number and duration of actuations per unit time and may result from the number of separate actuations or from the proportion or length of time that the system is actuated by a series of overlapping actuations, or both of these types of actuation. The "amount of actuation" in this sense increases as the number and duration of actuations per unit time increases, and is not concerned with any partial actuations, as in the present invention the actuatable device can be assumed to be fully actuated by a unit of traffic and to be not actuated in absence of traffic.

Certain methods of carrying out the invention have been disclosed in the above description and drawings which represent practical embodiments of the invention, although it will be understood that various modifications in the construction and changes in the arrangement of the parts may be made without departing from the spirit of the invention as defined by the appended claims.

I claim:

1. In a traffic control system for an intersection of traffic lanes, the combination of signals adapted to accord and interrupt right-of-way to said lanes, timing means for causing the signals to accord right-of-way to each of the intersecting lanes in succession in a time cycle, means for directing and receiving an energy beam across the intersection so as to be interrupted by a substantial part of traffic in all lanes while crossing the intersection, means connected with said timing means and acting responsive to interruption of said energy beam by traffic to lengthen said time cycle in accordance with the amount of such interruption.

2. In a traffic control system for the intersection of traffic lanes and having signals for indicating right-of-way to one of the lanes while interrupting right-of-way to the other lanes, the combination of timing means for controlling the signals to accord right-of-way for a time period to each of the lanes in succession, traffic actuatable means at the intersection operable upon actuation while right-of-way is being accorded to one lane to cause the timing means to increase only the period when right-of-way is next accorded to the said one lane.

3. In a traffic control system for the intersection of traffic lanes and having signals for indicating right-of-way to one of the lanes while interrupting right-of-way to the other lanes, the combination of timing means for controlling the signals to accord right-of-way for a time period to each of the lanes in succession, traffic actuatable means at the intersection operable upon actuation while right-of-way is being accorded to one lane to cause the timing means to increase the period when right-of-way is next accorded to the said one lane such increase being substantially proportional to the amount of such actuation.

4. In a traffic signal control system for the intersection of interfering traffic lanes, the combination of a traffic actuatable device in the intersection, signals for indicating right-of-way to one of the lanes at a time while interrupting right-of-way to the other lanes, timing means for causing the signals to accord right-of-way to each of the lanes in succession for predetermined periods of time, and means connected to the traffic actuatable device and to the timing means and acting responsive to actuation of said traffic actuatable device during one right-of-way period for said one lane to prolong the next right-of-way period on said one lane beyond the said predetermined period of time the amount of such prolongation being greater as the amount of actuation is greater.

5. In a traffic control system for a plurality of intersecting traffic lanes the combination of signals for indicating right-of-way to one of the lanes at a time while interrupting right-of-way to the other lanes, timing means for controlling the signalling means to accord right-of-way to each of the lanes in succession for predetermined periods of time and means actuatable by traffic as it passes thru the intersection and connected to the timing means responsive to actuations of said traffic actuatable means in the right-of-way period on one lane to prolong the next right-of-way period on said lane over the predetermined period of time such prolongation being substantially proportional to the total time duration of such actuations.

6. In a traffic control system for the intersection of traffic lanes and having signals for indicating right-of-way to one of the lanes while interrupting right-of-way to the other lanes, the combination of timing means for controlling the signals to accord right-of-way for a time period to each of the lanes in succession for predetermined periods of time, traffic actuatable means at the intersection operable upon actuation in the right-of-way period for one lane to cause the timing means to prolong the next right-of-way period on said lane beyond the said predetermined period of time such prolongation being greater as the total amount of time of actuation of the actuatable means during the first mentioned right-of-way period is greater.

7. In a traffic control system for the intersection of interfering traffic lanes, signals for according right-of-way to one of the lanes while interrupting right-of-way to the other lanes, timing means for controlling the signals to accord right-of-way to each of the interfering lanes in succession for predetermined minimum or greater periods, means providing an energy beam across the intersecting lanes for interruption by traffic passing thru the intersection, means responsive to interruptions of said energy beam during the right-of-way period in one lane to cause the timing means to prolong the next right-of-way period in said one lane beyond the predetermined minimum such prolongation being substantially proportional to the amount of time in said right-of-way period in which said energy beam is interrupted.

8. In a traffic control system for the intersection of interfering traffic lanes, signals for according right-of-way to one of the lanes while interrupting right-of-way to the other lanes, timing means for controlling the signals to accord right-of-way to each of the interfering lanes in succession normally for predetermined periods, means providing an energy beam across the intersection for interruption by traffic as it passes across the intersection, means responsive to interruption of said energy beam during the right-of-way period for one lane to register the amount of interruption of said energy beam during said right-of-way period, means for connecting the registering means as part of the timing means in the next right-of-way period on said lane for causing the timing means to extend said next right-of-way period beyond said predetermined period susbtantially in proportion to the amount of interruption so registered, and means providing a maximum limit to such an extension.

9. In a traffic signal control system for the intersection of two streets and having signals for indicating right-of-way to one of the streets while interrupting right-of-way to the other street, the combination of timing means for controlling the signals to accord right-of-way to each of the streets alternately for predetermined periods of time, a traffic actuatable detector located at a point nearer the intersection than the point at which traffic ordinarily stops when its right-of-way is interrupted to await accord of right-of-way whereby the detector is operated by traffic only in crossing the intersection, and means operable by actuation during the right-of-way period on one of the streets to influence the timing means to increase the length of a right-of-way period on said one street subsequent to the period in which the actuation occurred.

10. In a traffic control system for intersecting traffic lanes, signals for indicating right-of-way to one of the lanes while interrupting right-of-way to the other lanes, timing means for governing the signals to accord right-of-way to each of the lanes in succession in a time cycle, means providing an energy beam directed across the intersection and having a beam projector and cooperating beam receiver each set back from the edge of the pavement so that said beam will be interrupted by the passage of substantially all pedestrians and vehicles crossing the intersection along the lane having right-of-way, means responsive to interruption of said energy beam to adjust the right-of-way time cycle of the timing means in accordance with the amount of interruption by such vehicle and pedestrian traffic.

11. In a traffic control system for the intersection of traffic lanes and having signals for indicating right-of-way to one of the lanes while interrupting right-of-way to the other lanes, the combination of timing means for controlling the signals to accord right-of-way for a time period to each of the lanes in succession for predetermined periods of time, an energy beam directed across the portion of the intersection which is common to the intersecting lanes and arranged to be interrupted by units of traffic passing across the intersection and means responsive to interruption of said beam during the right-of-way period on one of the lanes to increase the next period of right-of-way on the said lane.

12. In a traffic signal control system for the intersection of two streets and having signals for indicating right-of-way to one of the streets while interrupting right-of-way to the other street, the combination of timing means for controlling the signals to accord right-of-way to each of the streets alternately for predetermined periods of time, two energy beams projected diagonally across the intersection and arranged to be interrupted by traffic, means responsive to interruption of only one of said beams during the right-of-way period on one street to cause the timing means to increase the next right-of-way period on said street and means responsive to interruption of only the other of said beams during the right-of-way period on the other street to cause the timing means to increase the next right-of-way period on said other street 13. In a traffic control system for the intersection of traffic lanes and having signals for indicating right-of-way to one of the lanes while interrupting right-of-way to the other lanes, the combination of timing means for controlling the signals to accord right-of-way for a time period to each of the lanes in succession for predetermined periods of time, a condenser forming a part of said timing means and means for placing an initial charge on said condenser at the start of a right-of-way period on one of the lanes, traffic actuatable means at the intersection operable upon actuation during the said right-of-way period to reduce the charge on said condenser the amount of such reduction being substantially proportional to the amount of such actuation, means for re-charging the condenser during the next right-of-way period on said one lane at a slow rate from the value to which it was reduced and up to a predetermined higher value, and means responsive to the charge on said condenser reaching said higher value to terminate said next right-of-way period, whereby the length of the next right-of-way period on said lane is determined by the amount of such actuation.

14. In a traffic control system for the intersection of traffic lanes and having signals for indicating right-of-way to one of the lanes while interrupting right-of-way to the other lane, the combination of timing means for controlling the signals to accord right-of-way for a time period to each of the lanes in succession for predetermined periods of time, a condenser forming a part of said timing means and means for placing an initial charge on said condenser at the start of a right-of-way period on one of the lanes, traffic actuatable means at the intersection operable upon actuation during the said right-of-way period to alter the charge on said condenser to a new value of charge the amount of such alteration being substantially proportional to the amount of such actuation in said period, means operable during the next right-of-way period on said one lane to vary the charge on said condenser at a slow rate from said new value in the direction of said initial value to a predetermined value beyond said initial value, and means responsive to the charge on said condenser reaching said predetermined value to terminate said next right-of-way period whereby the length of said next right-of-way period is determined by the amount of such actuation.

15. In a traffic control system for the intersection of traffic lanes and having right-of-way signals for said lanes, the combination of timing means for controlling the signals to accord right-of-way for a time period to each of the lanes in succession for predetermined periods of time in a time cycle, an energy beam directed across the portion of the intersection which is common to the intersecting lanes and arranged to be interrupted by traffic passing across the intersection and means responsive to interruption of said beam during one time cycle to increase the length of a succeeding time cycle.

16. In a traffic signal control system for intersecting streets having a time cycle of right-of-way indications for the respective streets for the control of traffic and adapted to have such time cycle adjusted in response to such traffic, a traffic responsive mechanism comprising means for producing an energy beam diagonally across the intersection so as to cross the path of and be interrupted by a substantial portion of all traffic passing through the intersection and means responsive to interruption of said energy beam to so adjust such time cycle by increasing it.

17. In a traffic signal system for intersecting streets having a time cycle of right-of-way indications for the respective streets for the control of traffic and adapted to have such time cycle adjusted in response to such traffic, a traffic responsive mechanism comprising means at one corner of the intersection for projecting an energy beam, means at the same corner responsive to the energy beam and interruption thereof, and means at the other corners of the intersection for directing said beam across all the intersecting streets and on to the energy beam responsive means whereby said beam will be interrupted by all traffic passing through the intersection and means operated by said beam responsive means to so adjust such time cycle to increase it in accordance with interruption of such beam by traffic.

18. In a traffic control system for use at a four-corner intersection of two intersecting streets, a time controlled signalling means for according right-of-way cyclically and alternately to said streets and traffic actuatable means for adjusting the time cycle of said mechanism, said last named means including means for projecting an energy beam along a diagonal connecting the near left with the far right hand corner with respect to traffic approaching on one of said streets and means when operable responsive to traffic interruption of said beam, means for projecting an energy beam along a diagonal connecting the near left with the far right hand corner of the other street with respect to traffic approaching therein and means when operable responsive to traffic interruption of said second beam, means for rendering said responsive means operable during the respective right-of-way periods on said streets whereby the traffic actuatable means will be actuated by substantially all traffic crossing the intersection except for right-turning traffic.

19. In a traffic control system for the intersection of two streets having right-of-way signals for the respective streets, traffic actuated means at the intersection and a time controlled signal operating mechanism to energize said signals alternately to the two streets in a time cycle variable in accordance with traffic actuation of said means, said traffic actuated means comprising means for directing and receiving energy beams across opposite diagonals at said intersection in position to be interrupted by traffic while crossing the intersection, and said mechanism comprising a cyclic switch device having a plurality of positions including one position for energizing the right-of-way signal for one street and another position for energizing the right-of-way signal for the other street, a timing device connected to operate said cyclic switch through such positions in a continuously repeated time cycle, and means including a connection with said cyclic switch device in said one position to connect one of said beam receiving means to said timing device to increase the time cycle of the latter in response to interruption of one of said beams and means including another connection to said cyclic switch device to connect said timing device to said other beam responsive means in said other position to increase said time cycle in response to interruption of the other said beam.

20. In a traffic control system for the intersection of two streets having right-of-way signals for the respective streets, traffic actuated means at the intersection and a time controlled signal operating mechanism to energize said signals alternately to the two streets in a time cycle variable in accordance with traffic actuation of said means, said traffic actuated means comprising means for directing and receiving energy beams across opposite diagonals at said intersection in position to be interrupted by traffic while crossing the intersection, and said mechanism comprising a cyclic switch device having a plurality of positions including one position for energizing the right-of-way signal for one street and another position for energizing the right-of-way signal for the other street, a timing device connected to operate said cyclic switch through such positions in a continuously repeated time cycle, and including a plurality of condensers, two condenser slow discharge circuits, one circuit including a switch operated by one beam receiving means upon interruption of its associated beam and the other circuit including another switch operated by the other beam receiving means upon interruption of its associated beam, slow recharging circuits for said condensers, and switches operated by said cyclic switch to connect each of said condensers successively to the respective discharge circuits and to the respective recharging circuits in the right-of-way positions for the respective streets as said cyclic switch operates through a series of cycles, each condenser being connected alternately to one of the discharge circuits in one right-of-way position for one street and to the recharging circuit in the next corresponding right-of-way period for said one street, and charge responsive means connected to said condenser in successive right-of-way positions and operating responsive to said condenser reaching a predetermined charged condition to operate said cyclic switch from one position to another in its cycle.

ALFRED PERCY BAILEY RENSHAW.